United States Patent [19]

Titcomb

[11] Patent Number: 5,516,212
[45] Date of Patent: May 14, 1996

[54] HYDRODYNAMIC BEARING WITH CONTROLLED LUBRICANT PRESSURE DISTRIBUTION

[75] Inventor: Forrest D. Titcomb, Colorado Springs, Colo.

[73] Assignee: Western Digital Corporation, Irvine, Calif.

[21] Appl. No.: 529,845

[22] Filed: Sep. 18, 1995

[51] Int. Cl.⁶ ........................................................ F16C 37/06
[52] U.S. Cl. ................................................ 384/107; 384/112
[58] Field of Search ............................. 384/100, 107, 384/112, 113

[56] References Cited

U.S. PATENT DOCUMENTS

| | | | |
|---|---|---|---|
| 4,795,275 | 1/1989 | Titcomb et al. | 384/107 |
| 5,067,528 | 11/1991 | Titcomb et al. | 141/4 |
| 5,112,142 | 5/1992 | Titcomb et al. | 384/107 |
| 5,246,294 | 9/1993 | Pan | 384/119 |
| 5,284,391 | 2/1994 | Diel et al. | 384/108 |
| 5,328,271 | 7/1994 | Titcomb | 384/108 |
| 5,358,339 | 10/1994 | Konno et al. | 384/107 |
| 5,407,281 | 4/1995 | Chen | 384/107 |
| 5,423,612 | 6/1995 | Zang et al. | 384/119 |

*Primary Examiner*—Thomas R. Hannon
*Attorney, Agent, or Firm*—James A. Ward; Leo J. Young

[57] ABSTRACT

A rotating-shaft hydrodynamic bearing assembly adapted for use in a rotating disk data store. The bearing assembly combines a plurality of spaced-apart radial journal bearings with a two-faced axial thrust plate to provide stiffness against runout at high rotational velocities. Fluid pressure is controlled on both sides of every fluid dement by bounding all radial fluid bearing layers and the dual thrust bearing layers with circumferential undercuts coupled to ambient pressure through a plurality of fluid-filled passages in the rotating shaft. Outward-biased surface-relief patterns are disposed in both axial thrust bearing layers to increase hydrostatic pressure and prevent cavitation in the non-bearing thrust-plate peripheral layer. The fluid bearing layers are disposed in a continuous pressure-controlled fluid film sealed at both ends by surface tension, thereby eliminating sources of air-bubble entrapment. Control of air-bubble entrapment and cavitation eliminates both as sources of surface-tension seal leakage and blowout.

32 Claims, 8 Drawing Sheets

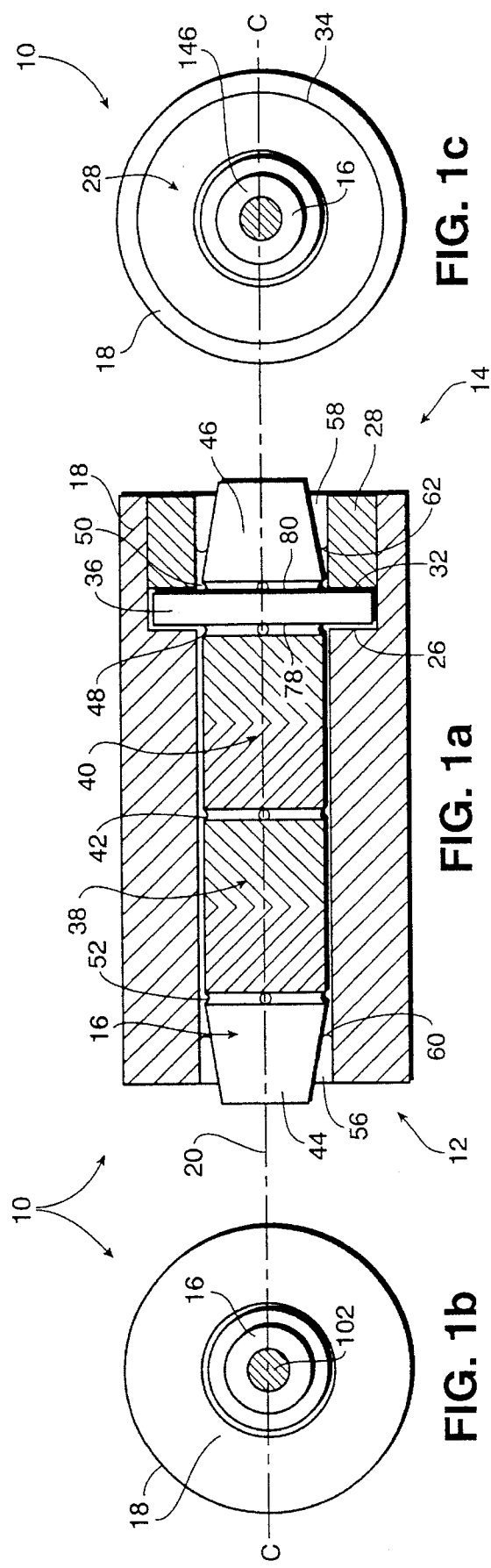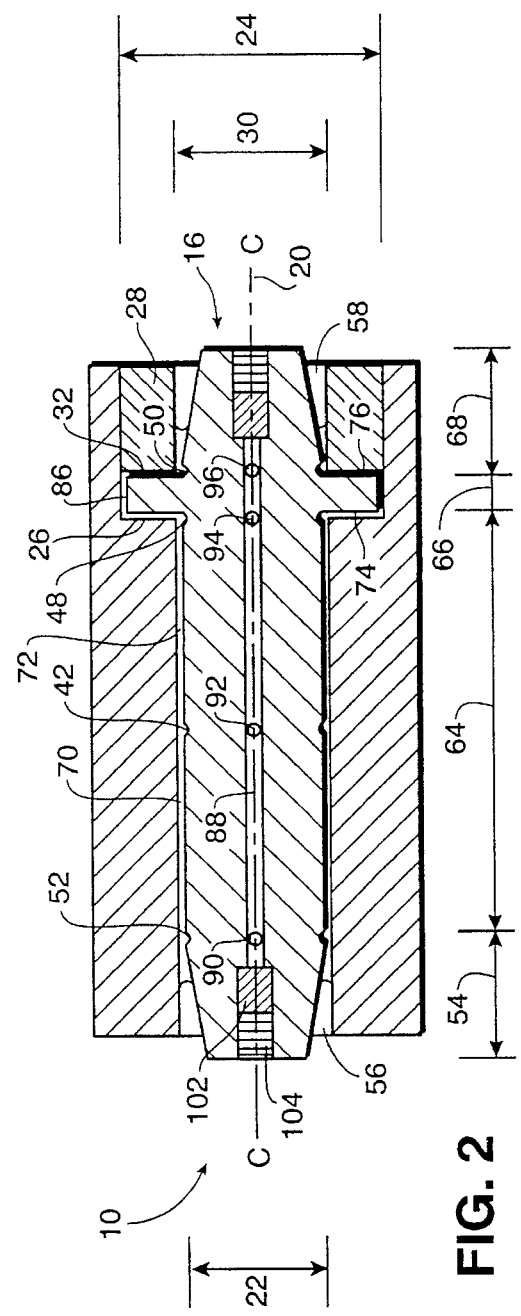

HYDRODYNAMIC BEARING WITH CONTROLLED LUBRICANT PRESSURE DISTRIBUTION

BACKGROUND OF THE INVENTION

1. Field of the Invention

This invention relates generally to hydrodynamic bearings for minimizing data storage disk runout at high rotational velocities and specifically to a stiffened rotating-shaft bearing having opposing thrust-bearing axial hydrodynamic pumping action and a plurality of equalized circumferential undercuts for controlling lubricant pressure distribution and eliminating cavitation.

2. Description of the Related Art

Continuing advances in computer data storage technology strongly motivate improvements in magnetic disk areal storage densities. Increased data storage densities require corresponding increases in sensor-to-disk positioning precision. Typically in the art, a sensing head reads or writes streams of data from or to tracks and sectors on the magnetic disk surface. The track width and lineal data density is related to the overall areal storage capacity of the disk surface. Because the typical magnetic disk data store includes several spinning magnetic disks suspended on a common precision spindle bearing assembly, bearing wobble or "runout" directly affects the precise location of microscopic data storage sites on the disk surface with respect to the data sensor.

As the bearing journal and bearing sleeve spin relative to one another, a point on the spin axis may trace out a path or orbit. The wobbling motion of this spin axis includes synchronous and asynchronous components, referred to in the art as repetitive runout and non-repetitive runout, respectively. Hydrodynamic spindle bearing designs are preferred in the disk data store art over the older ball-bearing spindle systems because the rolling elements in ball-bearing spindle systems produce relatively large non-repetitive runout arising from several causes, including imperfect race and ball geometries, surface defects, non-axisymmetric radial stiffness, misalignments and imbalances. Bearing runout limits the practical data storage density, which can be improved only by limiting spindle bearing assembly runout tolerances.

In hydrodynamic bearings, a lubricating fluid (either air or liquid) functions as the actual bearing element between a journal and sleeve in relative rotation. Liquid lubricants such as oil or more complex ferromagnetic fluids are known in the art for use in hydrodynamic bearing assemblies. When a lubricating liquid is used, the liquid itself must be sealed within the bearing assembly to avoid bearing "starvation" arising from fluid loss. Bearing starvation leads directly to increased wear and premature failure of the bearing assembly. In the recent art, such lubricant seals are embodied as "surface-tension" or "capillary" seals at the liquid/air interface of the lubricating fluid. In hydrodynamic bearings using ferromagnetic fluids, the seal may be achieved by establishing a magnetic field at each end of the bearing assembly. Other methods known in the art for avoiding bearing starvation include using centrifugal force to recirculate lubricant flow through passages within the bearing assembly and application of pressure to the bearing surface from an external lubricating fluid source.

The typical hydrodynamic bearing known in the an establishes pumping action in either radial or axial fluid films by defining a series of surface-relief grooves or a single helical surface-relief groove inclined at a particular angle relative to the axis in one of the bearing surfaces. For instance, the journal surface is commonly engraved with a surface-relief pattern disposed to cause the lubricating liquid to be urged toward the center of the journal bearing where it is maintained under pressure for so long as the relative rotation between journal and sleeve is maintained. One type of surface-relief pattern known in the art is the "herringbone" pattern, which may be embodied as a generally symmetrical pattern of repeated Vee-shaped or chevron-shaped relief grooves formed in either the journal or sleeve side of the cylindrical fluid film. The surface on one side of the fluid film is smooth and the relative unidirectional rotation of the grooved and smooth surfaces causes the lubricating liquid to enter the legs of each Vee groove responsive to the urging of liquid flow toward the apex of the Vee. The Vee apex experiences increased fluid pressure arising from the resulting pumping action, thereby creating and maintaining the hydrodynamic bearing layer under a steady pressure generated by the relative rotation of the two surfaces. Usually, the surface-relief patterns are disposed to produce equal and opposite pumping actions so that no net liquid flow occurs in any direction during rotation, thereby minimizing lubricating fluid loss.

The surface-tension or "capillary taper" seal known in the art requires additional measures to balance dynamic fluid pressure distribution within the rotating bearing assembly, such as pressure-equalizing flow passages or external pressure ports. Hydrodynamic bearing assemblies that employ the simple surface-tension taper seal may experience lubricant leakage arising from centrifugal effects of the rotating element (especially in a "fixed shaft" design having a rotating sleeve) and are vulnerable to lubricant blowout arising from entrapped gas bubbles and cavitation. Localized subambient hydrodynamic pressures within the lubricant bearing film may cause cavitation. Even bearing assemblies that use ferromagnetic fluids are known to suffer leakage problems as metallic particles within the ferro-suspension escape over time.

Disadvantageously, many workable lubricant seal designs known in the art require extremely tight clearances and alignments within the hydrodynamic bearing assembly. This often precludes cost-effective manufacture of such assemblies because of rejection or premature failure resulting from even a small deviation or aberration in a component dimension, shape or alignment. Also, as rotational speeds increase, centrifugal forces in the lubricant bearing film increase, thereby increasing stress on the traditional outwardly-tapered capillary seal, eventually causing leakage and lubricant depletion.

The hydrodynamic bearing art is replete with suggestions for improving bearing performance and for reducing fluid leakage during operation. For instance, a useful non-magnetic hydrodynamic bearing design is disclosed by Forrest Titcomb et al. in U.S. Pat. Nos. 4,795,275, 5,067,528, and 5,112,142. Titcomb et al. disclose a rotating shaft and thrust-plate combination disposed within a sleeve to form two pressure equalization ports. They use two thrust plates each with one annular axial thrust bearing layer on the inside face as well as two journal regions providing spaced-apart axial bearing layers to stiffen the bearing assembly against undesired repetitive runout. By adding pressure-equalization passages between the several axial and radial fluid bearing layers, Titcomb et al. prevent pressure buildup and eliminate lubricant fluid flow arising from unequal pressure distributions. Because unequal pressure distributions are eliminated, the two-degree (2°) tapered surface-tension seals at each end of their bearing assembly are sufficient to prevent substantial fluid leakage, but they do not consider a solution to the effects of bubble-entrapment and cavitation on fluid leakage rates.

In U.S. Pat. Nos. 5,284,391 and 5,328,271, Forrest Titcomb et al. disclose a hydrodynamic bearing assembly that employs a ball-and-socket geometry instead of the journal-and-sleeve geometry commonly known in the art. The "ball" surface is grooved to provide hydrodynamic pumping action in the hemispherical fluid bearing layer, which is sealed by surface-tension at the edges of the hemispherical ball-and-socket clearance. However, Titcomb et al do not consider solutions to the fluid seal and leakage problems related to bubble-entrapment and cavitation.

In U.S. Pat. No. 5,246,291, Coda Pan discloses a flow-regulating hydrodynamic bearing that includes two conical fluid bearing layers instead of the more common combination of orthogonal axial and radial bearing layers. Pan teaches the use of a design having a large reservoir for lubricating oil storage with a covering air volume in communication with ambient pressure and with surface-tension seals formed between respective central passages of shaft and housing end-caps. He provides for recapture of "wandering" lubricant when the bearing assembly is static and relies on centrifugal pumping to throw all statically-trapped oil into the lubricant reservoir during dynamic operation. Pan also proposes attaching a pressure-actuated bladder to the bearing for demand-delivery of lubricant. Thus, Pan resolves the lubricant leakage problem to his satisfaction with a combination of recapture, redelivery and large stand-by lubricant reserves and neither considers nor suggests solutions to the bubble-entrapment and cavitation effects on seal leakage.

In U.S. Pat. No. 5,407,281, Chen discloses a self-replenishing hydrodynamic bearing having a plurality of reservoirs containing a supply of lubricating fluid. He discloses a cyclical herringbone surface-relief pattern that generates alternating localized unidirectional lubricating fluid flow between the reservoirs. By causing fluid flow to alternate between adjacent grooves, Chen manages to provide localized flushing flow without incurring a net fluid flow sufficient to blow out the surface-tension seals. However, he neither considers nor suggests solutions to the bubble-entrapment and cavitation problems that may cause seal leakage or blowout.

In U.S. Pat. No. 5,358,339, Konno et al. disclose a hydrodynamic bearing assembly that employs liquid radial-bearing layers and gaseous axial-bearing layers in the same assembly. By eliminating liquid in the annular axial thrust bearing layer, they avoid fluid scattering arising from centrifugal forces, which eliminates one source of lubricating fluid leakage known in the art. Konno et al. also disclose a "chamfer" geometry for providing a surface-tension seal at the radial-bearing boundaries. However, Konno et al. neither consider nor suggest solutions to the bubble-entrapment and cavitation problems that may aggravate surface-tension seal leakage.

In U.S. Pat. No. 5,423,612, Yan Zang et al. disclose a hydrodynamic bearing and seal that includes a plurality of spaced-apart radial journal bearings and a single annular axial thrust plate with two surfaces each defining one side of two hydrodynamic thrust bearings. They use spaced-apart radial bearings to improve shaft stiffness for less repetitive runout in the bearing assembly. Although Zang et al. use surface-relief pumping patterns on both faces of their thrust plate, they rely on centrifugal force alone to hold the lubricating fluid within both axial bearing layers during rotation and neither consider nor suggest means to balance flow and avoid cavitation in the nonbearing fluid layer at the thrust plate periphery. Moreover, although Zang et al. use two radial bearing layers that are separated by substantial distance to improve stiffness, they do not suggest solutions to the bubble-entrapment problem.

Without a reasonable solution to the capillary seal leakage problems caused by air-entrapment and cavitation, practitioners in the art are obliged to either accept large runout in less stiff bearings or perhaps to resort to large fluid reservoirs and costly tight-tolerance clearance specifications to avoid unacceptable reduction in bearing life expectancy caused by premature lubricating fluid loss. These unresolved problems and deficiencies are clearly felt in the art and are solved by this invention in the manner described below.

SUMMARY OF THE INVENTION

This invention solves the above problems by combining several elements to control lubricating fluid pressure distribution in a spinning-shaft hydrodynamic bearing having two or more radial and at least two axial thrust bearing layers. These include stiffening the bearing assembly by separating the two radial bearing layers and adding circumferential undercuts in either the shaft or sleeve on each side of both radial bearing clearances and on each side of the thrust plate that supplies the two axial bearing layers. Surface-relief patterns are incorporated on both sides of the thrust plate to urge radially-outward fluid flow in both axial bearing clearances, which prevents cavitation by raising the hydrostatic pressure in the non-bearing clearance at the thrust plate periphery. All circumferential undercuts are interconnected by pressure-equalizing passages in the shaft, which may include a single axial passage interconnecting various radial and/or oblique passages. The fluid bearing layers are thus disposed to form a continuous pressure-controlled fluid film sealed at each end by diverging tapered surface-tension seals formed in tapered clearances between shaft and sleeve, thereby eliminating the usual sources of air-bubble entrapment. This control of air-bubble entrapment and cavitation eliminates both as sources of surface-tension seal leakage and blowout.

One object of this invention is to ensure balanced hydrostatic pressure throughout the entire bearing assembly in all of the several fluid bearing layers. It is a feature of this invention that both radial fluid bearing layers are disposed between circumferential undercuts, either in the shaft or in the sleeve. It is yet another feature of this invention that fluid pressure is controlled on both sides of every bearing element by coupling all radial fluid bearing layers and axial thrust bearing layers to a circumferential undercut (or overcut) and by coupling these circumferential undercuts to ambient pressure through a plurality of fluid-filled passages in the rotating shaft.

It is another object of this invention to prevent cavitation by eliminating any possibility of localized subambient hydrostatic pressure such as may occur in the non-bearing clearance between the thrust-plate periphery and the sleeve. It is a feature of this invention that the axial fluid bearing layers on each side of the thrust plate are urged radially-outward in balance to produce elevated static pressure at the thrust plate periphery without net fluid flow.

In a further refinement of this invention, a barrier film is provided on the surfaces bounding the tapered clearances at each end of the bearing, thereby discouraging lubricating fluid migration from the surface-tension seals at each end.

It is an advantage of the hydrodynamic bearing of this invention that it is adaptable for use in a rotating disk data storage device of the type commonly employed with host computers. It is a feature of this invention that one end of the shaft can be extended beyond the sleeve to permit mounting of a disk thereon.

It is an advantage of this invention that it permits scaleability and ease of manufacture. It is another advantage of this invention that it provides improved axial and radial stiffness, thereby reducing repetitive runout. It is yet another advantage of this invention that it requires relatively few components.

The foregoing, together with other objects, features and advantages of this invention, can be better appreciated with reference to the following specification, claims, and the accompanying drawing.

BRIEF DESCRIPTION OF THE DRAWING

For a more complete understanding of this invention, reference is now made to the following detailed description of the embodiments as illustrated in the accompanying drawing, in which like reference designations represent like features, and wherein:

FIG. 1a–1c show a partial cross-sectional side view and both end views of a first embodiment of the hydrodynamic bearing of this invention;

FIG. 2 shows a full cross-sectional side view of the hydrodynamic bearing from FIGS. 1a–1c;

FIG. 7a, is a schematic diagram illustrating the hydrostatic pressure distribution at full rotational velocity along the radial and axial fluid bearing clearances in the bearing assembly of this invention;

DETAILED DESCRIPTION OF THE PREFERRED EMBODIMENTS

Figure 3:
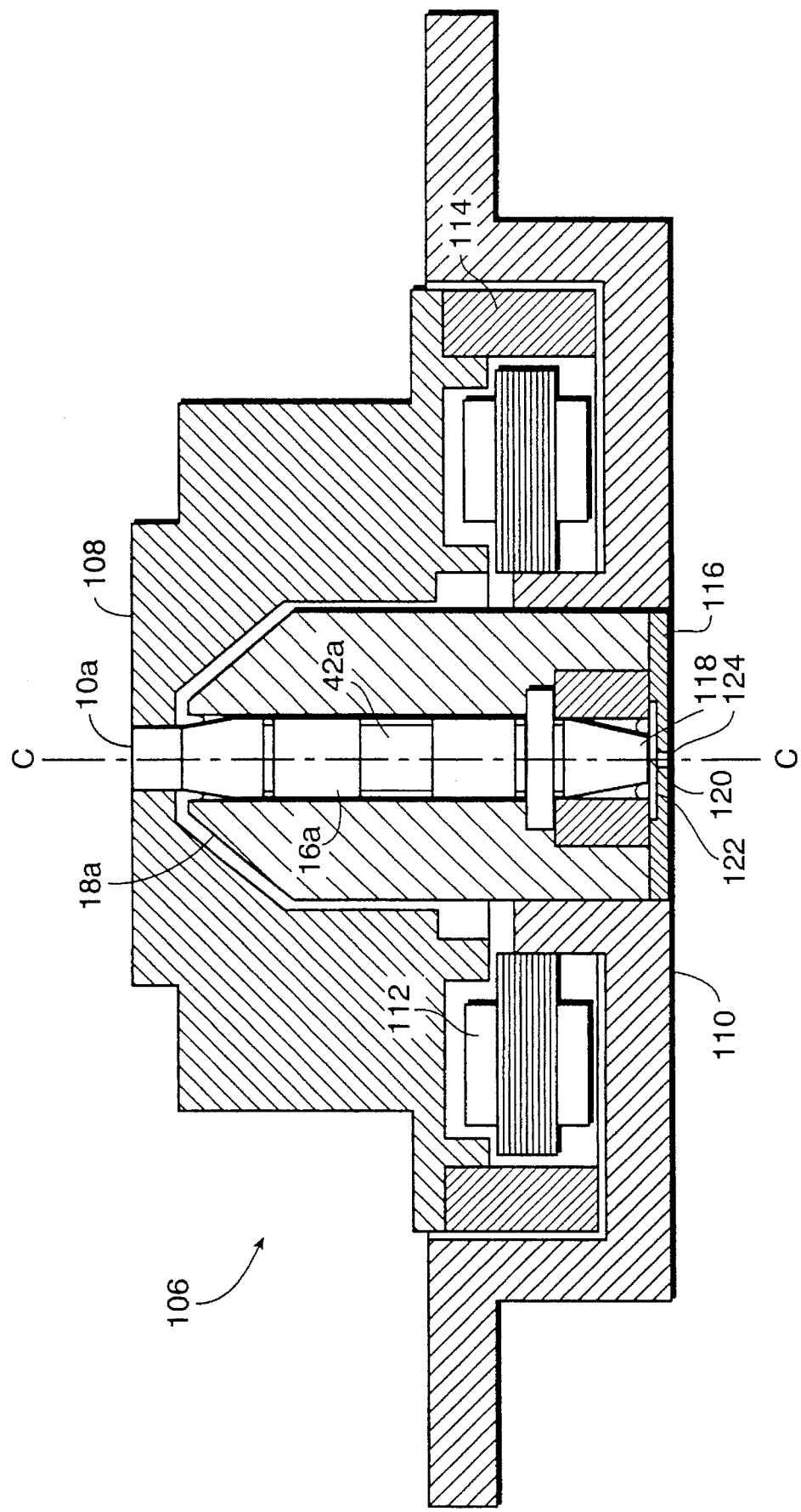
FIG. 3 shows a partial cross-sectional side view of a hard-disk drive motor assembly employing a second embodiment of the hydrodynamic bearing of this invention.

FIGS. 1a–1c show an exemplary embodiment of the hydrodynamic bearing assembly 10 of this invention, which has a first end 12, a view of which is shown in FIG. 1B and second end 14, a view of which is shown in FIG. 1c. FIG. 1a shows hydrodynamic bearing assembly 10 from the side. In a partial cross-section revealing the surface of a bearing shaft 16 disposed within a cross-sectional view of the substantially cylindrical support sleeve 18.

FIG. 2 shows a complete cross-sectional side view of hydrodynamic bearing assembly 10, which is disposed symmetrically about a bearing axis of rotation 20. Support sleeve 18 is shown having a first inner diameter 22 at first assembly end 12. Inner diameter 22 is stepped up to a second sleeve inner diameter 24 at second assembly end 14, thereby forming a sleeve shoulder 26. The effective inner diameter of support sleeve 18 is stepped down again at assembly end 14 by the insertion of a ring-shaped plug 28 having the inner diameter 30. One wall of plug 28 forms a second sleeve shoulder 32 when inserted fixedly as shown. Although inner sleeve diameter 22 and inner plug diameter 30 are shown as identical for illustrative purposes, an important advantage of the hydrodynamic bearing assembly 10 of this invention is that inner diameters 22 and 30 may differ, if desired, without compromising the effectiveness of the surface-tension seals formed at bearing ends 12 and 14.

Bearing shaft 16 is inserted into support sleeve 18 and disposed rotatably therein before inserting ring-shaped plug 28, which is secured to support sleeve 18 at the margin 34 by any useful means known in the art, such as epoxy adhesive, shrink-fitting or the like. Bearing shaft 16 includes a thrust plate 36 disposed adjacent to the two journals 38 and 40. Although journals 38 and 40 are shown as immediately adjacent to one another on bearing shaft 16, they may be instead disposed separated by a wider undercut (not shown), thereby increasing the stiffness of bearing assembly 10.

Thrust plate 36 and journals 38 and 40 are disposed between two tapered shaft ends 44 and 46. Thrust plate 36 is disposed between two circumferential undercuts 48 and 50, which should be created by reducing the outer diameter of bearing shaft 16 substantially as shown. Although undercuts 48 and 50 are shown as having a semicircular profile, any undercut profile is suitable so long as the depth and width satisfy the important fluid pressure equalization design requirements of this invention. Similarly, each of the two journals 38 and 40 are disposed between two circumferential undercuts. Journal 40 is disposed between undercut 48 and intermediate undercut 42. Journal 38 is disposed between intermediate undercut 42 and the circumferential undercut 52.

Although circumferential undercuts 42, 48, 50 and 52 are shown in FIGS. 1–2 as regions of reduced outer bearing shaft diameter, only undercuts 48 and 50 are preferably disposed in bearing shaft 16. All other undercuts may equally well be embodied as regions of increased inner diameter of similar volume in support sleeve 18. That is, intermediate undercut 42 and undercut 52 can equally well be embodied as circumferential overcuts (not shown) in support sleeve 18. As mentioned above, the exact volume, depth and profile of the undercut or overcut is an important design consideration for the hydrodynamic bearing assembly of this invention because the undercut fluid volume determines the reserve lubricating fluid availability to the fluid films in the bearing clearances, as described in more detail hereinbelow.

Bearing shaft 16 is disposed rotatably within support sleeve 18 to form a plurality of bearing and non-bearing clearances, which are now described. The outer surface of tapered shaft end 44 and the inner surface of the untapered sleeve end 54 define a first tapered clearance 56. Similarly, the outer surface of tapered shaft end 46 and the untapered inner diameter of ring-shaped plug 28 define a second tapered clearance 58. Tapered clearances 56 and 58 are disposed to create surface-tension seals that retain the lubricating fluid within the interconnected bearing clearances. Tapered clearance 56 creates the surface-tension seal 60 and tapered clearance 58 creates the surface-tension seal 62. Surface-tension seals 60 and 62 each consist of a substantially annular meniscus serving to seal the lubricating fluid within the bearing clearances. The degree of taper shown in the drawing has been exaggerated for clarity. In practice, a taper angle of less than five degrees (5°) is preferred. Similarly, the clearance dimensions defined by the respective sleeve and shaft surfaces and the undercut dimensions are also exaggerated in the drawing for purposes of clarity and may in practice be three orders of magnitude less than support shaft inner diameter 22.

Support sleeve 18 includes a radial bearing zone 64 and axial thrust bearing zone 66 disposed between the two untapered sleeve ends 54 and 68. The two journals 38 and 40 cooperate with inner support sleeve diameter 22 to form two roughly cylindrical radial-bearing clearances 70 and 72, respectively. That is, journal 38 defines cylindrical radial bearing clearance 70 and journal 40 defines cylindrical radial bearing clearance 72. Clearances 70 and 72 are filled with the lubricating fluid that also fills undercuts 42, 48 and 52 and all other clearances between seal 60 and seal 62.

In FIG. 1, journals 38 and 40 are shown with a herringbone surface-relief pattern disposed to increase hydrodynamic pressure within clearances 70 and 72 responsive to shaft rotation. These herringbone patterns may also be etched into radial bearing zone 64 of support sleeve 18 to equal effect. Hydrodynamic pumping occurs responsive to relative motion between a smooth surface and a very closely-disposed surface having the herringbone surface-relief pattern, whether or not the pattern is on the stationary surface or the moving surface. During rotation the precise separation between the shaft surface and sleeve surface at any particular locus depends on the applied radial load and the hydrodynamic pressure. When the local separation is reduced by lateral displacement, the hydrodynamic pumping action responsively increases local hydrodynamic pressure, thereby applying a force tending to increase separation. Thus, the hydrodynamic pumping action of the herringbone surface-relief pattern on journals 38 and 40 tends to force both clearances 68 and 70 into substantial cylindrical symmetry. For this reason, these clearances are herein denominated as "substantially cylindrical".

Note that radial bearing zone 64 includes two spaced-apart radial bearing clearances 70 and 72. This represents an important feature of this invention. Although journals 38 and 40 are shown separated by a relatively narrow undercut 42, separating clearances 70 and 72 on axis 20 by a wider distance is preferred to obtain advantageous stiffening of assembly 10 that reduces runout arising from temporary asymmetries within clearances 70 and 72.

Thrust plate 36 on shaft 16 cooperates with axial thrust bearing zone 66 in sleeve 18 to form two annular thrust-bearing clearances 74 and 76. Annular thrust-bearing clearance 74 is formed between sleeve shoulder 26 and the axis-normal plate face 78 on one side of thrust plate 36. Similarly, annular thrust bearing clearance 76 is formed between the axis-normal plate face 80 on the other side thrust plate 36 and second sleeve shoulder 32.

Figure 6:
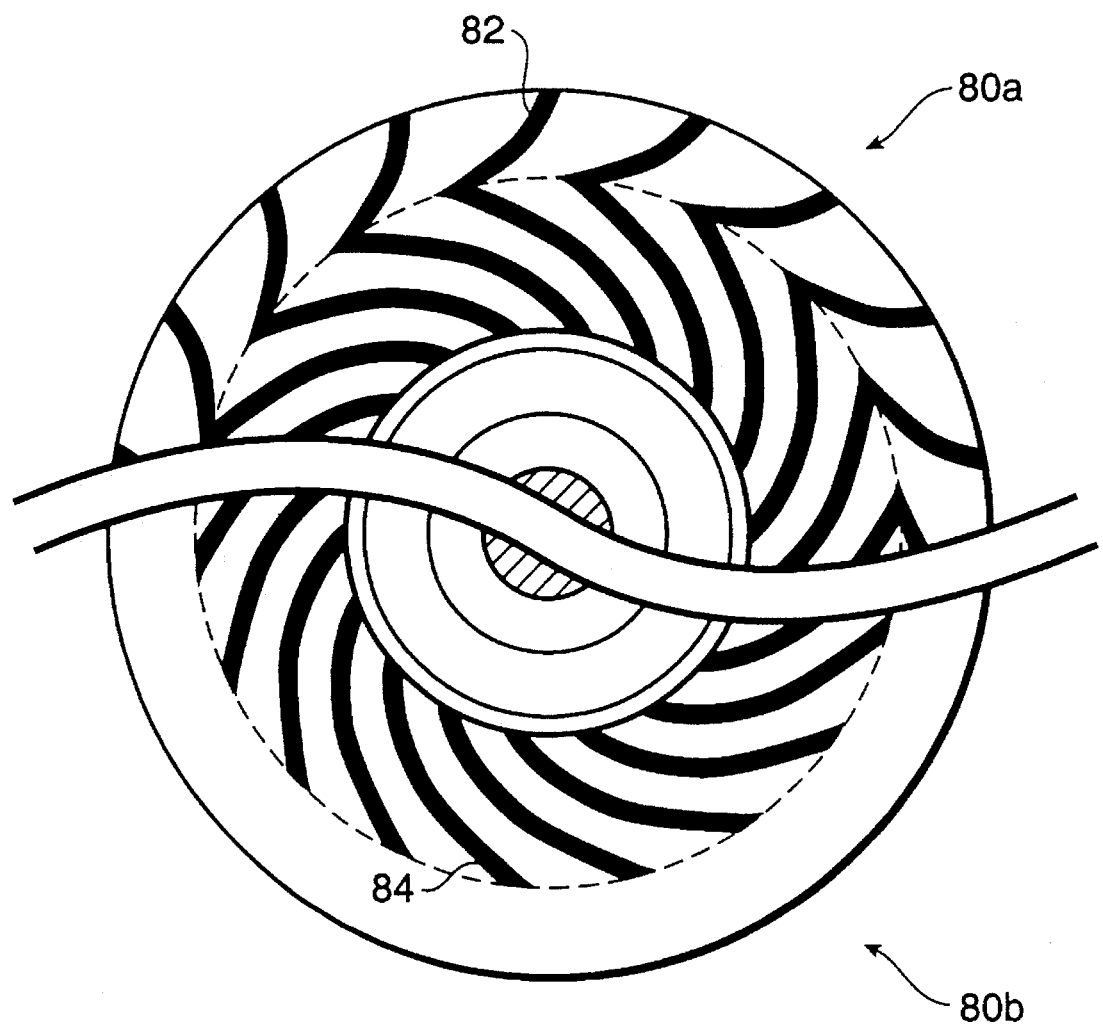
FIG. 6 shows an end view of the bearing shaft element of the hydrodynamic bearing assembly from FIGS. 1a–1c with two exemplary thrust-plate face surface-relief patterns suitable for use in this invention.

FIG. 6 provides a schematic illustration of plate face 80 exemplifying the surface-relief pattern used thereon. The patterns on plate faces 78 and 80 differ only in that they are mirror images of one another. Face 80a in FIG. 6 is shown with exemplary surface-relief pattern 82 and face 80b is shown with exemplary pattern 84. Either pattern 82 or 84 cooperates with a smooth surface on the respective shoulders 26 and 32 to provide hydrodynamic pumping of the lubricating fluid in a radially-outward direction within annular clearances 74 and 76. Of course, surface-relief pattern 82 (or 84) and its mirror image may also be disposed on the respective shoulders 32 and/or 26, in which case the matching surface of plate faces 78 and/or 80 would be smooth. The hydrodynamic pumping effect within clearances 74 and 76 arises from the relative motion of two annular surfaces, one of which has a surface-relief pattern such as pattern 82 or 84 and the other of which smooth. It is an important element of this invention that both clearances 74 and 76 operate in balance to urge the lubricating fluid in a radially-outward direction, thereby increasing static hydrodynamic pressure without net flow within the substantially-cylindrical non-bearing clearance 86 at the periphery of thrust plate 36. Another important element of this invention is the location of circumferential undercuts 48 and 50 in shaft 16 immediately on each side of thrust plate 36. Undercuts 48 and 50 provide reserve lubricating fluid, couple the axial bearing layer pressure to ambient, connect annular clearance 74 to cylindrical clearance 72 and connect annular clearance 76 to tapered clearance 58.

It may now be appreciated, with reference to the above description, that the interconnected fluid bearing layers within bearing assembly 10 are fully coupled from tapered clearance 56 through circumferential undercut 52 to radial bearing layer 70 and therefrom through cylindrical undercut 42 to radial bearing layer 72 and therefrom through cylindrical undercut 48 to axial thrust bearing layer 74 and therefrom through non-bearing clearance 86 to axial thrust-bearing layer 76 and therefrom through cylindrical undercut 50 to tapered clearance 58. The elevated hydrostatic pressure in non-bearing clearance 86 operates to prevent the cavitation that can occur in that region because of negative hydrostatic pressures fluctuations caused by interaction of thrust-bearing layers 74 and 76. The coupling of the axial bearing layers 74 and 76 seamlessly to radial bearing layers 70 and 72 for the first time eliminates gas-bubble entrapment at the multiple capillary seals normally used in the art. The entire lubricating fluid volume within bearing assembly 10 is sealed only on each end by surface-tension seals 60 and 62.

FIG. 2 provides a cross-sectional representation of bearing shaft 16 that shows a plurality of internal passages disposed to equalize hydrodynamic pressure throughout assembly 10. That is, this invention provides direct pressure equalization between all circumferential undercuts 42, 48, 50 and 52 by coupling them to one another through a plurality of passages. Preferably, a plurality of radial or oblique passages are coupled centrally by a central axial passage 88 extending from one end to the other of shaft 16. Radial passages 90, 92, 94 and 96 connect central passage 88 with circumferential undercuts 52, 42, 48 and 50, respectively. Passages 88, 90, 92, 94 and 96 also provide an additional lubricating fluid reservoir to dampen fluctuations in local pressure. Fabrication of axial passage 88 in shaft 16 can be accomplished by machining and insertion of a plug 102 and appropriate seal 104 to cap passage 88 at both ends of shaft 16, substantially as shown.

The lubricating fluid within assembly 10 may be a shearing oil such as a polyalphaolefin oil as known to practitioners skilled in the art. For instance, it has been found that NYE132B or NYE179 oil from the W. F. Nye Corp., Bedford, Mass. is suitable for use with the bearing assembly of this invention.

The exact dispositions of the surface-tension seal menisci 60 and 62 depend on the degree of taper in tapered clearances 56 and 58, respectively, and also depend on the "wetting" characteristics of the shaft and sleeve surfaces that form clearances 56 and 58. The axial surface-tension forces forming capillary seals 60 and 62 depend on the length of the wetted perimeter of the liquid-gas interface, the liquid lubricant surface-tension, the taper angle and the contact angle. The axial positioning of menisci 60 and 62 varies with internal hydrodynamic pressure arising from bearing operation, first moving at startup and then stabilizing when the surface-tension forces and the internal hydrodynamic pressure forces balance. Sudden large increases in internal hydrodynamic pressure that can result from gas-bubble entrapment or cavitation may cause seal blow-out or fluid leakage. This invention eliminates these sources of surface-tension seal failure by using an opposing thrust bearing patterning scheme and by controlling hydrodynamic pressure throughout the interconnected plurality fluid-filled clearances, as discussed above. The actual hydrostatic pressure distribution of this invention within the lubricating fluid layers is described below in connection with FIGS. 7–8.

It has been found that applying a barrier-film coating on each pair of surfaces forming tapered clearances 56 and 58 prevents migration of the lubricating fluid from menisci 60 and 62. For instance, a coating of NYEBAR (a trademark of William F. Nye Corp, supra) prevents wetting of the surfaces by the lubricating fluid, thereby increasing the meniscus contact angles sufficiently to eliminate fluid migration. As is known for normal uncoated metal surfaces, a lubricating oil migrates along the surface by wetting to create a meniscus angle of about zero degrees. Using a barrier-film coating increases the meniscus contact angle to about 75 degrees (for NYEBAR), thereby eliminating most migration and spontaneous surface wetting in the seal regions.

Bearing assembly 10 is adapted for use in a data store apparatus as part of the disk transport mechanism 106 shown in FIG. 3, which presents a partial cross-sectional view of mechanism 106. Assembly 10a is shown disposed vertically with the thrust plate down. Shaft undercut 42a is shown having a width that is preferably larger than the undercut width shown in FIGS. 1a–1c and 2. The shaft 16a is captured in a sleeve 18a having an external shape and dimensions tailored to disk transport mechanism 106. A mounting hub 108 is affixed to the upper end of shaft 16a for rotation therewith. Mechanism 106 has a base 110 adapted for mounting within the data store apparatus (not shown). A stator 112 and a ting magnet 114 form a motor to turn mounting hub 108 (and shaft 16a) at high speed. A dust cover 116 protects the end base member 118 and end face 120 of shaft 16a. A clearance 122 is provided between end face 120 and dust cover 116, wherein an optional grounding brush (not shown) may be situated. Dust cover 116 includes a porous port 124 to provide the necessary atmospheric pressure venting for the liquid-gas interface of the surface-tension seals discussed above. The enlarged circumferential undercut 42a shows that the undercut and patterning features of this invention, may vary in size and placement depending upon the particular implementation. For example, in a hard disk drive for a notebook computer, the entire length of assembly 10a may be less than 2.5 centimeters and yet support a variety of disk platter diameters and weights or even a plurality of stacked disk platters (not shown).

Figure 4:
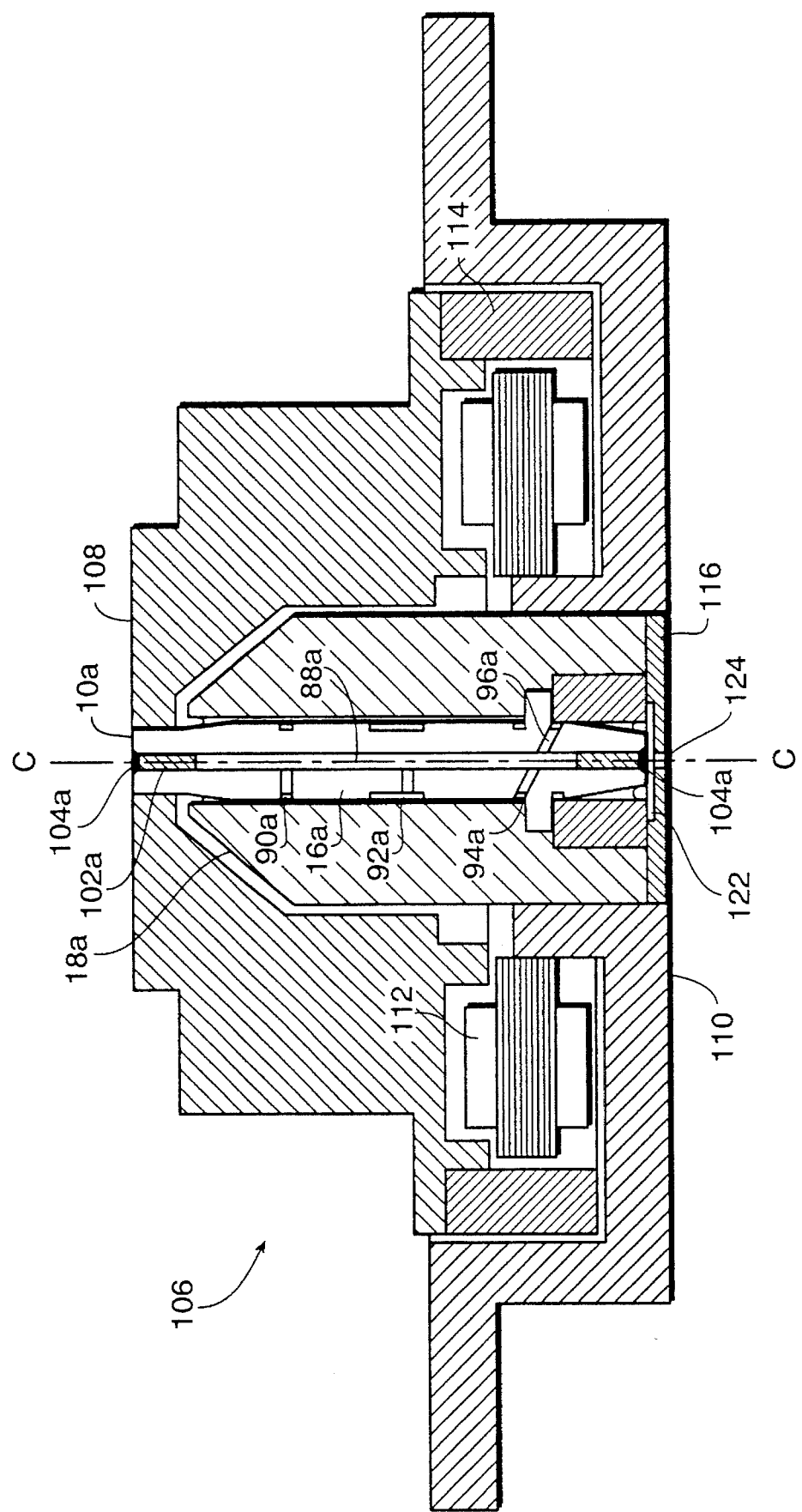
FIG. 4 shows a full cross-sectional side view of the hard-disk drive motor assembly from FIG. 3.

FIG. 4 shows the disk transport mechanism 106 from FIG. 3 in full cross-section, thereby revealing passages 88a, 90a, 92a, 94a and 96a within shaft 16a. Note that passages 94a and 96a are disposed obliquely instead of radially, thereby demonstrating that the precise passage geometry used in this invention may be varied for ease of construction or for other purposes. For instance, the inventor has found that a single oblique drill hole can be used to fabricate both passages 94a and 96a, thereby simplifying manufacture without affecting the hydrodynamic pressure equalization control of this invention. Central axial passage 88a is sealed at each end by a plug 102a and a weld 104a tailored to the adaptation for disk transport mechanism 106.

Figure 5:
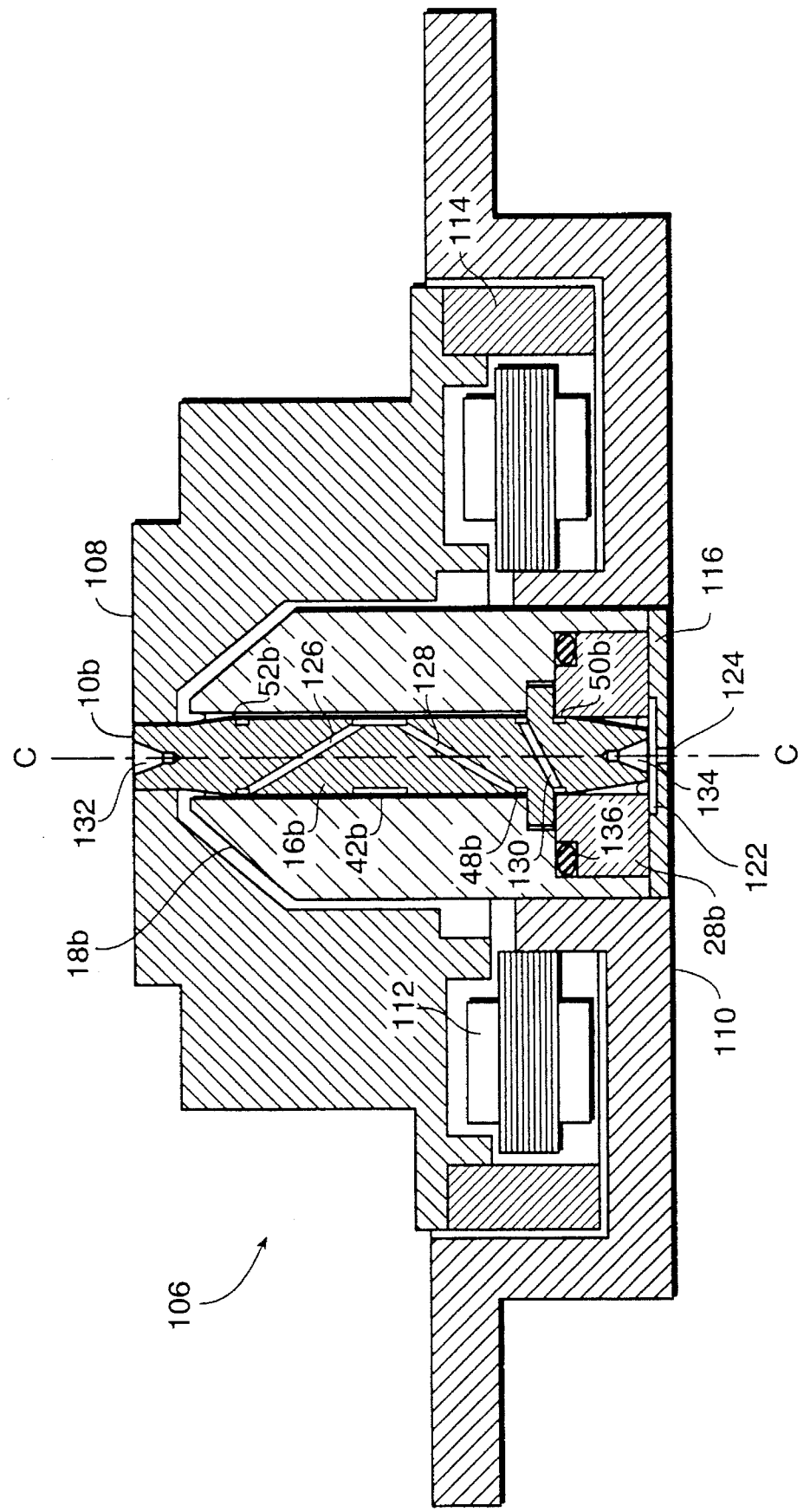
FIG. 5 shows a full cross-sectional side view of a third embodiment of the hard-disk drive motor assembly of this invention.

FIG. 5 shows an alternative embodiment contemplated by the inventor for use of the hydrodynamic bearing assembly of this invention. Bearing assembly 10b includes a bearing shaft 16b with the oblique passages 126, 128 and 130. Oblique passage 126 connects undercuts 52b and 42b. Oblique passage 128 connects undercuts 42b and 48b. Passage 130 connects undercuts 48b and 50b. Accordingly, because undercuts 52b, 42b, 48b and 50b are interconnected using only the three oblique passage 126, 128 and 130, no central axial passage is necessary in shaft 16b. Elimination of the central axial passage also eliminates all plugs and seals. In this embodiment, the conical cavities 132 and 134 are retained in the ends of shaft 16b to eliminate the additional machining that otherwise would be necessary to flatten and seal the ends. Ring-shaped plug 28b is shown using an O-ring seal 136.

Figure 7:
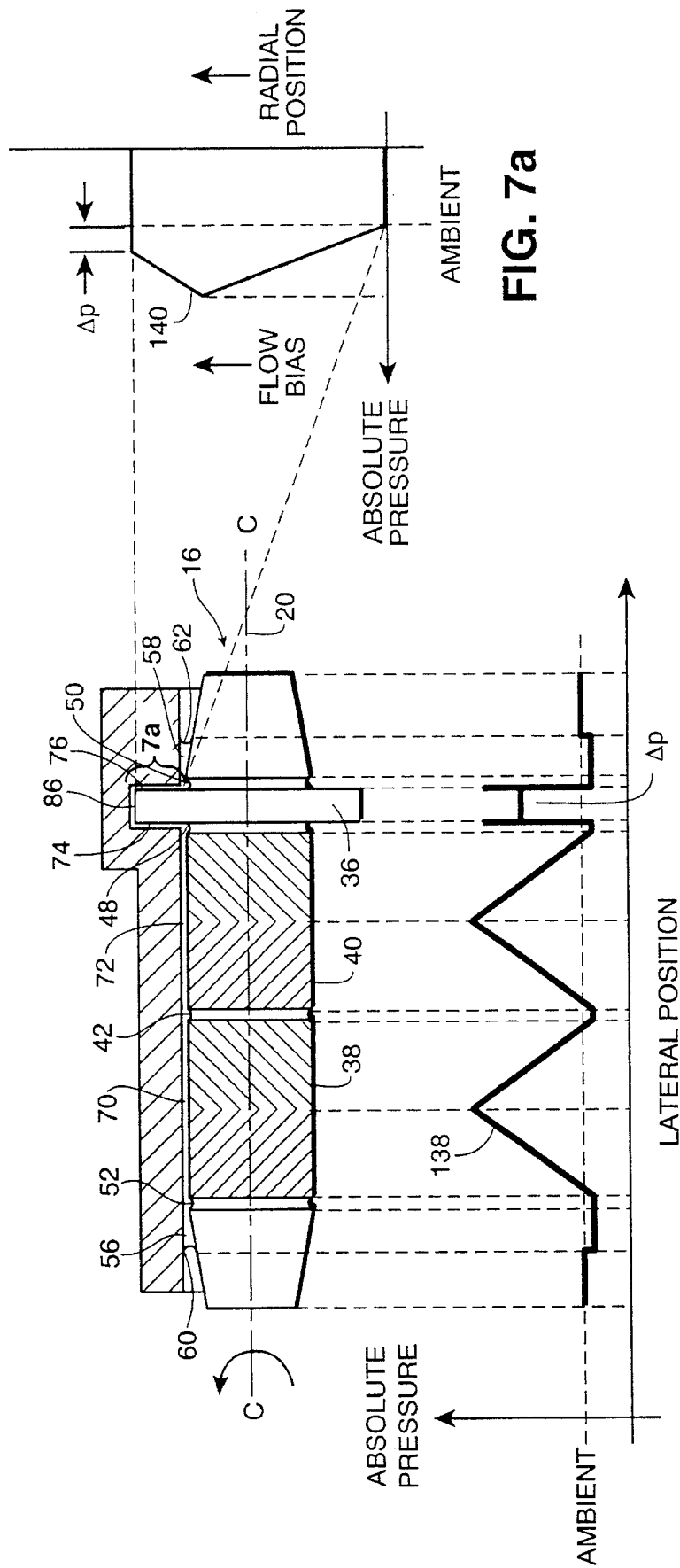
FIG. 7, including detail

FIG. 7 is a schematic diagram of the hydrostatic lubricating fluid pressure distribution along the fluid-filled bearing clearances described above. The pressure profile 138 shows fluid pressure as a function of lateral position along axis 20. The pressure profile 140 shows hydrostatic fluid pressure as a function of radial position and is substantially identical for both axis-normal faces 74 and 76 on thrust plate 36. Beginning at meniscus 60, the pressure drops slightly from ambient to accommodate the surface-tension loss at the air/fluid interface. This pressure remains constant over tapered clearance 56 and within circumferential undercut 52. The pressure rises sharply along radial bearing clearance 70 because of the hydrodynamic pumping action of the surface-relief pattern on journal 38. The symmetric herringbone pattern on the surface of journal 38 causes the pressure profile to peak at the middle and fall back symmetrically to the slightly less than ambient level at circumferential undercut 42, where it remains across the entire width of undercut 42. The pressure profile in the second radial bearing clearance 72 is substantially the same as that shown for clearance 70 because the pattern on journal 40 is substantially the same as that for journal 38. The pressure within undercut 48 remains slightly less than ambient because it is coupled to undercuts 42, 52 and 50 by the journal passages discussed above in connection with FIGS. 2 and 4–5. Hydrostatic pressure within non-bearing clearance 86 at the periphery of thrust plate 36 is elevated by $\Delta p$ (see FIG. 7a) above ambient because of the opposing outwardly-biased pumping actions of axial bearing clearances 74 and 76. Again, the pressure returns to slightly below ambient at undercut 50 and remains there within and across tapered clearance 58 until it returns to ambient at meniscus 62.

FIG. 7a shows the hydrostatic pressure distribution along a radius of axial bearing clearance 76, which is representative of the radial pressure distribution over both annular thrust bearing clearances 74 and 76. As mentioned above in connection with FIGS. 1–2 and 6, the surface-relief patterns on faces 78 and 80 are both disposed asymmetrically to urge axially-outward fluid flow, causing the pressure increases with radial position until it peaks at a radius more than half-way to the thrust plate periphery, at which point it begins to fall symmetrically toward the reduced pressure level ($\Delta p$) within non-bearing clearance 86. This reduced "thrust-periphery" pressure $\Delta p$ prevents cavitation within clearance 86. Both axial bearing clearances 74 and 76 enclose "outward-pumping" bearing layers that force an increase in fluid pressure within clearance 86 without net fluid flow around thrust plate 36.

It can be readily appreciated with reference to the above discussion in connection with FIGS. 7 and 7a that the continuous sealed fluid layer from meniscus 60 to meniscus 62 offers no opportunity for entrapping gas bubbles during rotation of shaft 16. Moreover, examination of both pressure profiles 138 and 140 shows conclusively that, except for surface tension losses, there is no localized negative pressure and thus no possible fluid cavitation during operation.

Figure 8:
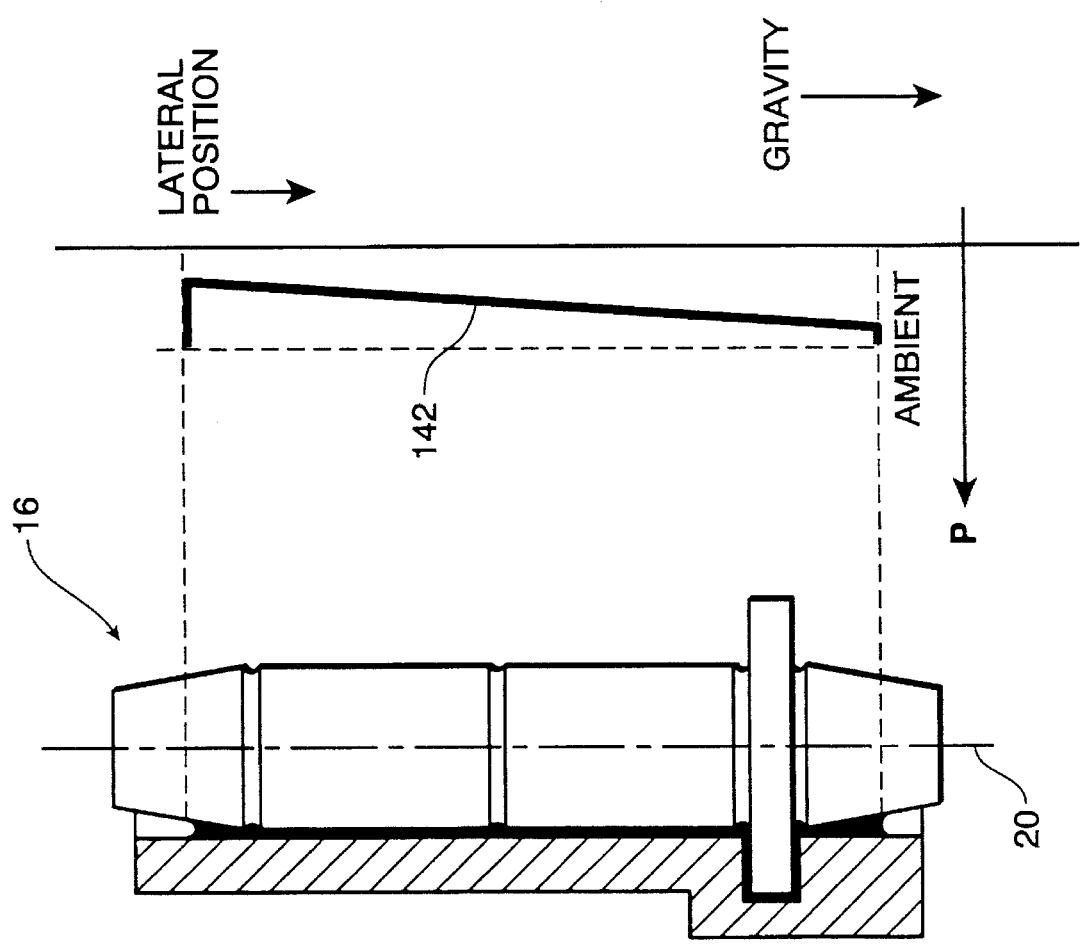
FIG. 8 is a schematic diagram illustrating the hydrostatic pressure bias arising from vertical disposition of the hydrodynamic bearing assembly of this invention.

FIG. 8 shows a third pressure profile 142 that illustrates the additional effect of axially-aligned gravity on the axial pressure distribution 138 from FIG. 7 during operation. The static pressure bias from one end to the other is merely the equivalent hydrostatic head produced by gravity.

Figure 9:
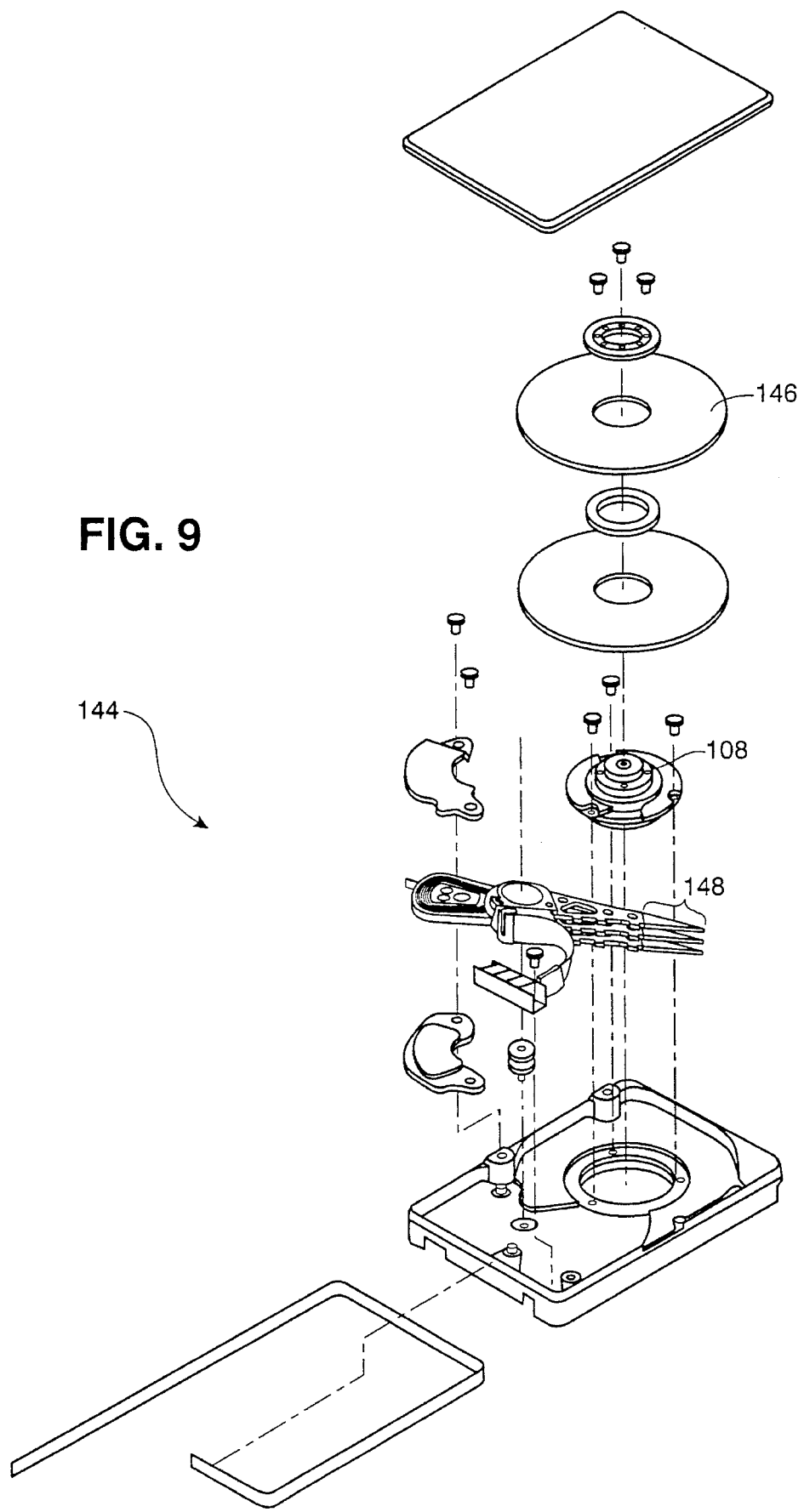
FIG. 9 is an exploded perspective diagram of an illustrative hard-disk data store apparatus employing the hydrodynamic bearing assembly of this invention.

FIG. 9 shows a typical data store apparatus 144 adapted for use of the hydrodynamic bearing assembly 10 of this invention. A plurality of rotatable data storage disks, exemplified by disk 146, is shown disposed for mounting on hub 108, which is affixed to assembly 10 for rotation. A head assembly 148 is also shown disposed for moveable engagement with the surfaces of rotatable data storage disks 146 in the manner well-known in the art.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A hydrodynamic bearing assembly for supporting rotation of an object about a bearing axis, said assembly comprising:

a support sleeve having an inner sleeve diameter centered on said bearing axis and untapered at each of two sleeve ends and having one or more radial bearing zones and at least one axial thrust bearing zone with two axis-normal sleeve shoulders formed by steps in said inner sleeve diameter;

a bearing shaft having an outer shaft diameter centered on said bearing axis and tapered at each of two shaft ends and having one or more journals each disposed between two circumferential undercuts and having at least one thrust plate with two axis-normal plate faces formed by steps in said outer shaft diameter disposed between two circumferential undercuts, said bearing shaft being disposed rotatably within said support sleeve to form a substantially cylindrical radial-bearing clearance between each said journal and a corresponding said radial bearing zone and to form a substantially annular thrust-bearing clearance between each said axis-normal plate face and a corresponding said axis-normal sleeve and to form a tapered clearance between each said shaft end and a corresponding said sleeve end, said annular thrust-bearing clearances being coupled to one another by a non-bearing peripheral clearance between said thrust plate and said support sleeve, all said clearances being filled with a lubricating liquid that forms a surface-tension seal at each said tapered clearance, wherein a surface on at least one side of each said cylindrical radial-bearing clearance and a surface on at least one side of each said annular thrust-bearing clearance have surface-relief patterns each disposed to increase hydrodynamic pressure in the corresponding said clearance responsive to rotation of said bearing shaft with respect to said support sleeve; and a plurality of passages within said bearing shaft each disposed to communicate fluid pressure between at least two said circumferential undercuts.

2. The hydrodynamic bearing assembly of claim 1 wherein said surface-relief pattern disposed on said at least one side of said each annular thrust-bearing clearance operates to urge a radially-outward flow of said lubricating liquid responsive to said rotation of said bearing shaft.

3. The hydrodynamic bearing assembly of claim 2 wherein said radially-outward flows of said lubricating liquid in said annular thrust-bearing clearances offset one another to create an elevated hydrostatic pressure in said non-bearing peripheral clearance without net fluid flow through said non-bearing peripheral clearance.

4. The hydrodynamic bearing assembly of claim 3 further comprising:

a central passage disposed within said bearing shaft to communicate fluid pressure among said plurality of passages.

5. The hydrodynamic bearing assembly of claim 4 further comprising:

a barrier-film coating on said sleeve ends for discouraging sleeve-end surface wetting by said lubricating liquid.

6. The hydrodynamic bearing of claim 5 comprising:

two adjacent said radial bearing zones disposed adjacent one said axial thrust bearing zone wherein all said surface-relief patterns are on said bearing shaft.

7. The hydrodynamic bearing of claim 1 comprising:

two adjacent said radial bearing zones disposed adjacent one said axial thrust bearing zone.

8. The hydrodynamic bearing assembly of claim 7 wherein said surface-relief pattern disposed on said at least one side of said each annular thrust-bearing clearance operates to urge a radially-outward flow of said lubricating liquid responsive to said rotation of said bearing shaft.

9. A hydrodynamic bearing assembly for supporting rotation of an object about a bearing axis, said assembly comprising:

a support sleeve having an inner sleeve diameter centered on said bearing axis and untapered at each of two sleeve ends and having one or more radial bearing zones each disposed between two circumferential undercuts and having at least one axial thrust bearing zone with two axis-normal sleeve shoulders formed by steps in said inner sleeve diameter;

a bearing shaft having an outer diameter centered on said bearing axis and tapered at each of two shaft ends and having one or more journals and having at least one thrust plate with two axis-normal plate faces formed by steps in said outer shaft diameter disposed between two circumferential undercuts, said bearing shaft being disposed rotatably within said support sleeve to form a substantially cylindrical radial-bearing clearance between each said journal and a corresponding said radial bearing zone and to form a substantially annular thrust-bearing clearance between each said axis-normal plate face and a corresponding said axis-normal sleeve shoulder and to form a tapered clearance between each said shaft end and a corresponding said sleeve end, said annular thrust-bearing clearances being coupled to one another by a non-bearing peripheral clearance between said thrust plate and said support sleeve, all said clearances being filled with a lubricating liquid that forms a surface tension seal at each said tapered clearance, wherein a surface on at least one side of each said cylindrical radial-bearing clearance and a surface on at least one side of each said annular thrust-bearing clearance have surface-relief patterns each disposed to increase hydrodynamic pressure in the corresponding said clearance responsive to rotation of said bearing shaft with respect to said support sleeve; and a plurality of passages within said bearing shaft each disposed to participate in communicating fluid pressure between said circumferential undercuts.

10. The hydrodynamic bearing assembly of claim 9 wherein said surface-relief pattern disposed on said at least one side of said each annular thrust-bearing clearance operates to urge a radially-outward flow of said lubricating liquid responsive to said rotation of said bearing shaft.

11. The hydrodynamic bearing assembly of claim 10 wherein said radially-outward flows of said lubricating liquid in said annular thrust-bearing clearances offset one another to create an elevated hydrostatic pressure in said non-bearing peripheral clearance without net fluid flow through said non-bearing peripheral clearance.

12. The hydrodynamic bearing assembly of claim 11 further comprising:

a central passage disposed within said bearing shaft to communicate fluid pressure among said plurality of passages.

13. The hydrodynamic bearing assembly of claim 12 further comprising:

a barrier-film coating on said sleeve ends for discouraging sleeve-end surface wetting by said lubricating liquid.

14. The hydrodynamic bearing assembly of claim 13 comprising:

two adjacent said radial bearing zones disposed adjacent one said axial thrust bearing zone wherein all said surface-relief patterns are on said bearing shaft.

15. The hydrodynamic bearing assembly of claim 9 comprising:

two adjacent said radial bearing zones disposed adjacent one said axial thrust bearing zone.

16. The hydrodynamic bearing assembly of claim 15 wherein said surface-relief pattern disposed on said at least one side of said each annular thrust-bearing clearance operates to urge a radially-outward flow of said lubricating liquid responsive to said rotation of said bearing shaft.

17. A data store apparatus for use with a host computer, said data store apparatus comprising:

a disk assembly having at least one rotatable data storage disk with at least one surface adapted for storage of data thereon;

a disk transport mechanism coupled to said rotatable data storage disk and including a motor for selectively imparting rotational motion to said data storage disk; and a fluid bearing in said disk transport mechanism for supporting said rotatable data storage disk for rotation about a bearing axis, said fluid bearing including a support sleeve having an inner sleeve diameter centered on said bearing axis and untapered at each of two sleeve ends and having one or more radial bearing zones and having at least one axial thrust bearing zone with two axis-normal sleeve shoulders formed by steps in said inner sleeve diameter, a bearing shaft having an outer shaft diameter centered on said bearing axis and tapered at each of two shaft ends and having one or more journals each disposed between two circumferential undercuts and having at least one thrust plate with two axis-normal plate surfaces formed by steps in said outer shaft diameter disposed between two circumferential undercuts, said bearing shaft being disposed rotatably within said support sleeve to form a substantially cylindrical radial-bearing clearance between each said journal and a corresponding said radial bearing zone and to form a substantially annular thrust-bearing clearance between each said axis-normal plate face and a corresponding said axis-normal sleeve shoulder and to form a tapered clearance between each said shaft end and a corresponding said sleeve end, said annular thrust-bearing clearances being coupled to one another by a non-bearing peripheral clearance between said thrust plate and said support sleeve, all said clearances being filled with a lubricating liquid that forms a surface tension seal at each said tapered clearance, wherein a surface on at least one side of each said cylindrical radial-bearing clearance and a surface on at least one side of each said annular thrust-bearing clearance have surface-relief patterns each disposed to increase hydrodynamic pressure in the corresponding said clearance responsive to rotation of said bearing shaft with respect to said support sleeve, and a plurality of passages within said bearing shaft each disposed to communicate fluid pressure between at least two said circumferential undercuts.

18. The data store apparatus of claim 17 wherein said surface-relief pattern disposed on said at least one side of said each annular thrust-bearing clearance operates to urge a radially-outward flow of said lubricating liquid responsive to said rotation of said bearing shaft.

19. The hydrodynamic bearing assembly of claim 18 wherein said radially-outward flows of said lubricating liquid in said annular thrust-bearing clearances offset one another to create an elevated hydrostatic pressure in said non-bearing peripheral clearance without net fluid flow through said non-bearing peripheral clearance.

20. The data store apparatus of claim 19 further comprising:

a central passage disposed within said bearing shaft to communicate fluid pressure among said plurality of passages.

21. The data store apparatus of claim 20 further comprising:

a barrier-film coating on said sleeve ends for discouraging sleeve-end surface wetting by said lubricating liquid.

22. The data store apparatus of claim 21 comprising:

two adjacent said radial bearing zones disposed adjacent one said axial thrust bearing zone wherein all said surface-relief patterns are on said bearing shaft.

23. The data store apparatus of claim 17 comprising:

two adjacent said radial bearing zones disposed adjacent one said axial thrust bearing zone.

24. The data store apparatus of claim 23 wherein said surface-relief pattern disposed on said at least one side of said each annular thrust-bearing clearance operates to urge a radially-outward flow of said lubricating liquid responsive to said rotation of said bearing shaft.

25. A data store apparatus for use with a host computer, said data store apparatus comprising:

a disk assembly having at least one rotatable data storage disk with at least one surface adapted for storage of data thereon;

a disk transport mechanism coupled to said rotatable data storage disk and including a motor for selectively imparting rotational motion to said data storage disk; and a fluid bearing in said disk transport mechanism for supporting said rotatable data storage disk for rotation about a bearing axis, said fluid bearing including a support sleeve having an inner sleeve diameter centered on said bearing axis and untapered at each of two sleeve ends surfaces and having one or more radial bearing zones each disposed between two circumferential undercuts and having at least one axial thrust bearing zone with two axis-normal sleeve shoulders formed by steps in said inner sleeve diameter;

a bearing shaft having an outer shaft diameter centered on said bearing axis and tapered at each of two shaft ends and having one or more journals and having at least one thrust plate with two axis-normal plate faces formed by steps in said outer shaft diameter disposed between two circumferential undercuts, said bearing shaft being disposed rotatably within said support sleeve to form a substantially cylindrical radial-bearing clearance between each said journal and a corresponding said radial bearing zone and to form a substantially annular thrust-bearing clearance between each said axis-normal plate face and a corresponding said axis-normal sleeve shoulder and to form a tapered clearance between each said shaft end and a corresponding said sleeve end, said annular thrust-bearing clearances being coupled to one another by a non-bearing peripheral clearance between said thrust plate and said support sleeve, all said clearances being filled with a lubricating liquid that forms a surface tension seal at each said tapered clearance, wherein a surface on at least one side of each said cylindrical radial-bearing clearance and a surface on at least one side of each said annular thrust-bearing clearance have surface-relief patterns each disposed to increase hydrodynamic pressure in the corresponding said clearance responsive to rotation of said bearing shaft with respect to said support sleeve; and a plurality of passages within said bearing shaft each disposed to participate in communicating fluid pressure between said circumferential undercuts.

26. The data store apparatus of claim 25 wherein said surface-relief pattern disposed on said at least one side of said each annular thrust-bearing clearance operates to urge a radially-outward flow of said lubricating liquid responsive to said rotation of said bearing shaft.

27. The hydrodynamic bearing assembly of claim 26 wherein said radially-outward flows of said lubricating liquid in said annular thrust-bearing clearances offset one another to create an elevated hydrostatic pressure in said non-bearing peripheral clearance without net fluid flow through said non-bearing peripheral clearance.

28. The data store apparatus of claim 27 further comprising:

a central passage disposed to communicate fluid pressure among said plurality of passages.

29. The data store apparatus of claim 28 further comprising:

a barrier-film coating on said sleeve ends for discouraging sleeve-end surface wetting by said lubricating liquid.

30. The data store apparatus of claim 29 comprising:

two adjacent said radial bearing zones disposed adjacent one said axial thrust bearing zone wherein all said surface-relief patterns are on said bearing shaft.

31. The data store apparatus of claim 25 comprising:

two adjacent said radial bearing zones disposed adjacent one said axial thrust bearing zone.

32. The data store apparatus of claim 31 wherein said surface-relief pattern disposed on said at least one side of said each annular thrust-bearing clearance operates to urge a radially-outward flow of said lubricating liquid responsive to said rotation of said bearing shaft.

* * * * *